United States Patent [19]

Hertl et al.

[11] Patent Number: 5,284,638
[45] Date of Patent: Feb. 8, 1994

[54] SYSTEM AND METHOD FOR REMOVING HYDROCARBONS FROM GASEOUS MIXTURES USING MULTIPLE ADSORBING AGENTS

[75] Inventors: William Hertl; Irwin M. Lachman; Mallanagouda D. Patil, all of Corning, N.Y.

[73] Assignee: Corning Incorporated, Corning, N.Y.

[21] Appl. No.: 925,026

[22] Filed: Aug. 5, 1992

[51] Int. Cl.$^5$ ............................................... B01D 53/02
[52] U.S. Cl. .................... 423/245.1; 423/210; 423/213.2; 502/407; 502/414; 502/415
[58] Field of Search ............... 423/212, 213.2, 213.5, 423/245.1, 210; 208/310 Z; 502/407, 414, 415

[56] References Cited

U.S. PATENT DOCUMENTS

| | | | |
|---|---|---|---|
| 3,769,202 | 10/1973 | Plank et al. | 502/67 |
| 3,773,690 | 11/1973 | Heinze et al. | 502/67 |
| 3,885,977 | 5/1975 | Lachman-Lewis . | |
| 4,127,691 | 11/1978 | Frost . | |
| 4,758,272 | 7/1988 | Pierotti-Wusirika . | |
| 4,985,210 | 1/1991 | Minami . | |
| 4,992,233 | 2/1991 | Swaroop-Wusirika . | |
| 5,045,515 | 9/1991 | Chao et al. | 502/60 |
| 5,051,244 | 9/1991 | Dunne et al. | 423/213.5 |
| 5,078,979 | 1/1992 | Dunne | 423/212 |
| 5,125,231 | 6/1992 | Patil-Socha-Lachman . | |
| 5,140,811 | 8/1992 | Minami et al. | 423/213.7 |
| 5,142,864 | 9/1992 | Dunne | 423/213.7 |

OTHER PUBLICATIONS

Mobile Source Division, Research Div., CA Air Resources Board, Part B/Appendix A-1, Sep. 27, 1991, "Proposed Reactivity Adjustment Factors for Transitional Low-Emission Vehicles".

*Primary Examiner*—Anthony McFarlane
*Attorney, Agent, or Firm*—L. Rita Quatrini

[57] ABSTRACT

A system and method are disclosed for removing hydrocarbons from a gaseous mixture, which comprises selecting a plurality of agents which are effective for adsorbing hydrocarbons at predetermined temperatures, wherein for at least two of the adsorbing agents, the temperatures at which the maximum adsorption rates for the hydrocarbons occur, are different from one another, and contacting the adsorbing agents with the gaseous mixture at the predetermined temperatures to cause adsorption of the hydrocarbons. A multistage catalyst system for converting $NO_x$, $CO$, and hydrocarbons from a gaseous mixture to innocuous products is disclosed, which comprises the above described system for removing hydrocarbons as one stage, and a main body catalyst stage for converting $NO_x$, $CO$, and hydrocarbons to innocuous products, wherein the gaseous mixture passes from one stage to the other.

5 Claims, 2 Drawing Sheets

SYSTEM AND METHOD FOR REMOVING HYDROCARBONS FROM GASEOUS MIXTURES USING MULTIPLE ADSORBING AGENTS

This invention relates to a system and method for removing hydrocarbons from a gaseous mixture which is expected to change in temperature. Adsorbing agents are chosen based on their adsorbing and desorbing characteristics for the hydrocarbons at the various operating temperatures of the mixture. The system and method are especially suited for removing hydrocarbons from auto exhaust in which case, the adsorbing agents are selected to maximally adsorb hydrocarbons emitted at engine start up based on the temperature range of the auto exhaust during the start-up period, before the main catalyst is up to operating temperature.

BACKGROUND OF THE INVENTION

Internal combustion engines emit a large amount of unburned hydrocarbons during cold engine start-up. In fact, a substantial fraction of the emitted hydrocarbons have been found to occur during the first ten of seconds due to the rich fuel mixture.

Release of hydrocarbons immediately after starting an engine poses a special problem because at this point the temperature of the conventional catalytic reactor is not high enough for conversion to innocuous products. The catalysts utilized in catalytic converter systems are generally ineffective at ambient temperature and must reach high temperatures, often in the range of 300°–400° C. before they are activated.

One method of reducing cold start emissions is to temporarily adsorb hydrocarbons on zeolites which desorb at engine operating temperature and are converted by the main body catalyst.

One disadvantage of this method is that specific zeolites do not adsorb with equal efficiency at the full temperature range of the exhaust gas at start-up, that is, from room temperature to about 300° C. Additionally, the adsorbed hydrocarbons can prematurely desorb before the main conversion catalyst is up to operating temperature, thus emitting hydrocarbons to the atmosphere.

This problem is addressed in U.S. Pat. No. 4,985,210 which relates to an exhaust gas purifying apparatus which has a 3-way catalyst and either Y-type zeolite or a mordenite as an adsorbent for adsorbing a harmful component at the upstream side of the catalytic converter so that when the exhaust gas temperature exceeds the specific temperature, the harmful component desorbs from the adsorbent and is introduced into the catalytic converter. Further, an activated carbon trapper and a by-pass are provided in parallel at the upstream side of the adsorbent so that the flow paths of exhaust gas are selectively switched from one to the other in accordance with the level of exhaust gas temperature. Activated carbon is present for adsorbing at the lower temperature, the Y-type zeolite or mordenite is for adsorbing at the higher temperatures seen by the exhaust gas before engine operating temperatures normal for continuous operation are reached. The activated carbon is separate from the other adsorbing agents to prevent the activated carbon from being exposed to high temperature and eventually destroyed and to prevent excessive pressure drop in the exhaust system.

European patent application publication no. 0460542A2 relates to an engine exhaust system having two catalytic converters, a first noble metal catalytic converter positioned near the engine exhaust manifold and a second converter positioned farther from the exhaust manifold. The second converter contains molecular sieve (zeolite) materials capable of adsorbing and holding hydrocarbons to prevent their discharge into the atmosphere until the catalyst in the converters attains an efficient operating temperature. Because hydrocarbons begin to desorb from the zeolite at a temperature below light-off, it is not possible merely to place zeolite 'in-line' in the exhaust system with the catalyst, the system employs one or more conveying means with several valves to selectively convey exhaust gases to each of the two catalytic converters in a manner such that initially produced hydrocarbon is withheld in the system by molecular sieves in order to be recycled through the converters and brought into contact with the catalyst after an effective converting temperature has been attained.

It would be desirable to have a way to efficiently adsorb hydrocarbons without premature desorption at engine start-up which would not result in destruction of the adsorbing agents.

SUMMARY OF THE INVENTION

In accordance with one aspect of the invention, there is provided a method for removing hydrocarbons from a gaseous mixture, which comprises selecting a plurality of agents which are effective for adsorbing hydrocarbons at predetermined temperatures, wherein for at least two of the adsorbing agents, the temperatures at which the maximum adsorption rates for the hydrocarbons occurs are different from one another, and contacting the adsorbing agents with the gaseous mixture at the predetermined temperatures to cause adsorption of the hydrocarbons.

In accordance with another aspect of the invention, there is provided a catalyst system for removing hydrocarbons from a gaseous mixture, the system comprising a plurality of preselected adsorbing agents which are effective for adsorbing the hydrocarbons at predetermined temperatures, the adsorbing agents being in contact with a substrate. For at least two of the adsorbing agents, the temperatures at which the maximum adsorption rates for the hydrocarbons occurs, are different from one another.

In accordance with another aspect of the invention, there is provided a multi-stage catalyst system for converting $NO_x$, CO, and hydrocarbons from a gaseous mixture to innocuous products, which comprises the above described system for removing hydrocarbons as one stage, and a main body catalyst stage for converting $NO_x$, CO, and hydrocarbons to innocuous products, wherein the gaseous mixture passes from one stage to the other.

DETAILED DESCRIPTION OF THE INVENTION

Figure 1:
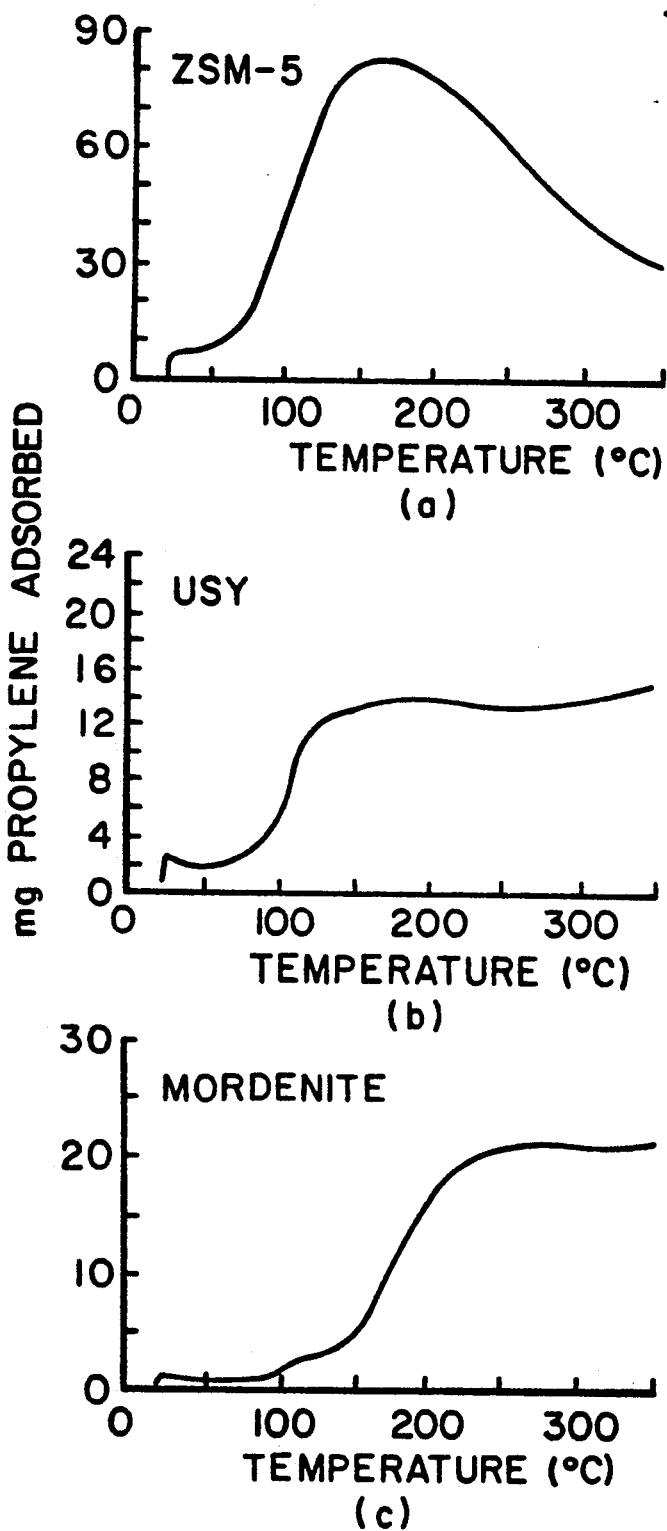
FIGS. 1a, 1b, and 1c are plots of propylene adsorption on the ZSM-5, Ultra-stable Y, and mordenite, as a function of temperature.

This invention provides a system and method for removing hydrocarbons from gaseous mixtures using more than one selected adsorbing agent. The system makes use of staged temperatures for maximum adsorption rates. The temperature at which rapid adsorption of hydrocarbons is most rapid is different for at least two of the adsorbing agents. All the adsorbing agents are thermally stable at the temperatures seen by the mixture.

The system and method are especially suited for removing hydrocarbons from auto exhaust in which case, the adsorbing agents are selected to maximally adsorb hydrocarbons emitted at engine start up based on temperature ranges of the auto exhaust at the start-up period in the interval from ambient temperature to the time at which the main catalyst is up to operating temperature. Minimal desorption occurs before the main body catalyst is activated (light-off).

The method and system of the invention can be used in treating any gaseous mixture of hydrocarbons. Examples of hydrocarbons, although it is to be understood that the invention is not limited to these, are low molecular weight or light hydrocarbons found in gasoline, diesel fuel, alcohols and their products of combustion and molecular rearrangements. Alkanes and alkenes with 1 to 6 carbon atoms are considered to be low molecular weight hydrocarbons. Especially suited to the practice of the present invention are low molecular weight alkenes (olefins). Some examples are ethylene, propylene, butadiene, pentene, and other unsaturated hydrocarbons. The invention is especially suited for, although not limited to, removal of hydrocarbons having a Maximum Incremental Reactivity (MIR) of greater than about 1.0. The MIR is a measure of the propensity of a given hydrocarbon to form ozone expressed as grams ozone/gram of organic gas. The MIR is used in calculating the potential amount of ozone formed per mile for a specific hydrocarbon. In general, alkanes or paraffins have low MIR values ($<0.5$), aromatic compounds vary from $<1$ to about 10, and light alkenes or olefins especially ethylene, propylene and butadiene have very high MIR values of about 7.2 to about 10.8. Description of MIR values and a list of the MIR values assigned to various hydrocarbons is given in Technical Support Document entitled "Proposed Reactivity Adjustment Factors for Transitional Low-Emission Vehicles", Sep. 27, 1991, Mobile Source Division, Research Division, California Air Resources Board, Part B, and Appendix A-1.

The exhaust gas mixture contains typically about 2500 to 10000 volume ppm of hydrocarbons during the initial start-up period which is typically less than about 5 minutes, but this can vary.

The system and method are especially suited for treating auto exhaust gas streams, especially at engine start-up and before light-off, light off being the temperature at which the main conversion catalyst is capable of converting about 50% of the $NO_x$, CO, and hydrocarbons. The exhaust gas mixture contains typically about 2500 to 10000 volume ppm of hydrocarbons during the initial engine start-up period which is typically less than about 5 minutes, but this can vary.

Adsorption is the taking up and holding of molecules by physical or chemical forces, termed respectively physical or chemical adsorption.

According to the present invention, the adsorbing agents are selected based on their maximum adsorption rates at the temperature ranges which the hydrocarbon-containing mixture is to be exposed. By knowing or predetermining what these maximum adsorption rates are at different temperatures, adsorbing agents can be selected so that the temperatures at which the maximum adsorption rates occur are different for at least two of them. In this way, the overall adsorption efficiency is greater in the entire temperature range that the mixture is exposed to than when only one adsorbing agent is used. Expressed another way, the temperature at which maximum adsorption rate occurs is the temperature above which an adsorbing agent will rapidly start to adsorb hydrocarbons, especially $C_1-C_6$ hydrocarbons. One requirement of the adsorbing agents is that they are all stable at the operating temperatures. They can be in the form of one intimate mixture or sequentially staged according to their operating (activation) temperatures.

In accordance with the preferred embodiment of treating auto exhaust gas at engine start-up and before light-off, the adsorbing agents are selected to adsorb and retain the hydrocarbons at temperatures in the range of room temperature to the temperature at which the main catalyst becomes active, about 250° C. to about 350° C. Adsorbed hydrocarbons on various adsorbing agents can desorb to greater or lesser extent in this range of room temperature to about 250° or 350° C. The preferred mode is to use an agent which desorbs to a lesser extent, the hydrocarbons thereon decomposing or oxidizing. In this embodiment, it is preferred to have at least one adsorbing agent the maximum adsorption rate of which occurs at a first temperature range of about room temperature to about 160° C., at least one adsorbing agent the maximum adsorption rate of which occurs at a second temperature range of about 90° C. to about 175° C., and at least one adsorbing agent, the maximum adsorption rate of which occurs at a third temperature range of at least about 110° C., and most typically from about 110° C. to about 250° C. The preferred adsorbing agents are molecular sieves. It is preferred that the first temperature adsorbing agent be a pentasil structure zeolite, preferably ZSM-5 zeolite, or a beta zeolite or combinations of these. It is preferred that the second temperature adsorbing agent be ultra stable Y type. It is preferred that the third temperature adsorbing agent be mordenite type. FIGS. 1a, 1b, and 1c show the peak adsorption efficiencies of ZSM-5 zeolite, ultrastable Y and mordenite (about 1.8 g each). These figures illustrate that the maximum adsorption values for these three adsorbing agents vary across the temperature range from room temperature to about 250° C. The relative amounts of adsorbing agents can be adjusted to enhance the adsorbing efficiency of any one adsorbing agent.

Figure 2:
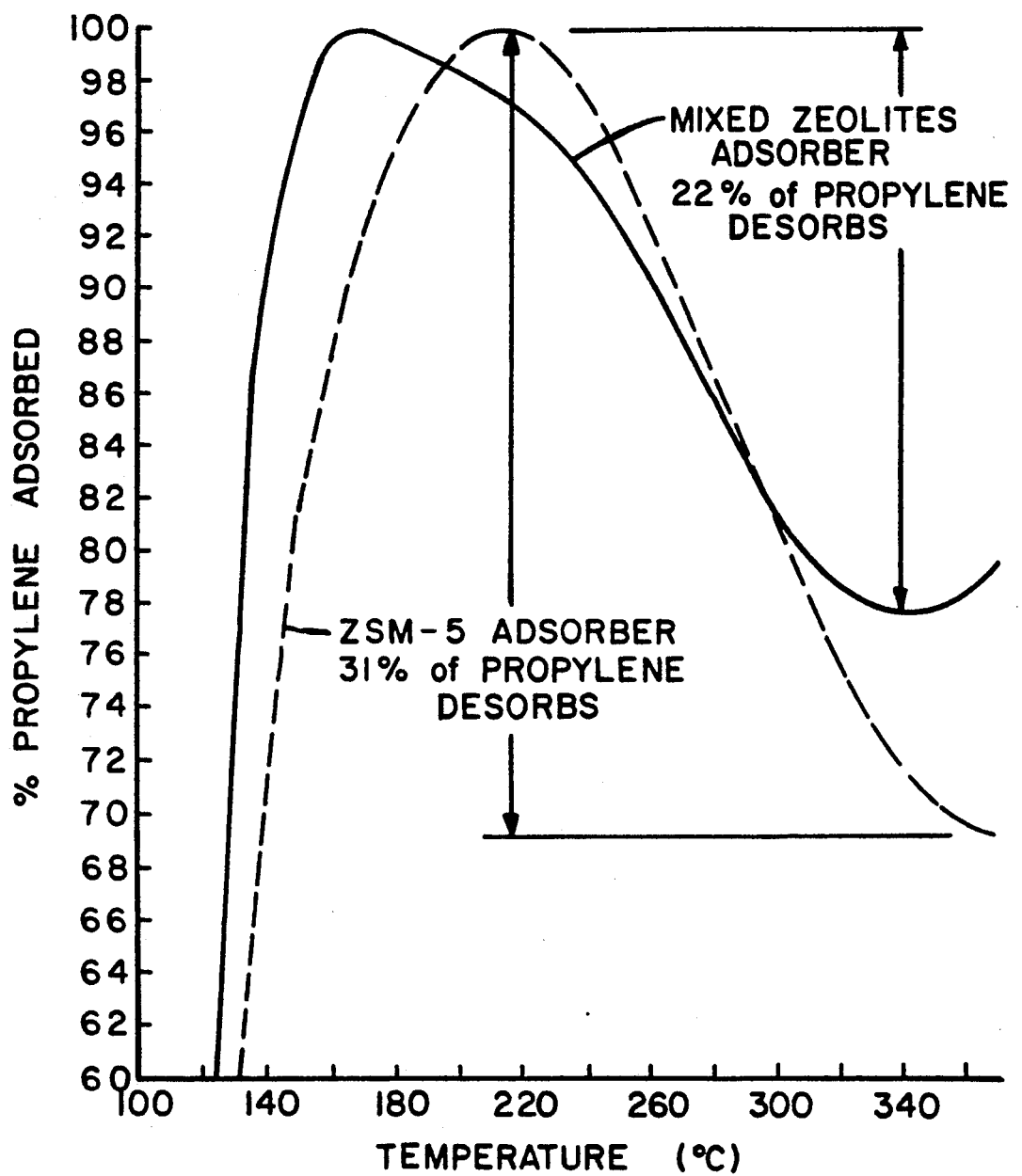
FIG. 2 is a plot of percent propylene adsorbed versus temperature by ZSM-5 zeolite and by a mixture of ZSM-5, Ultra-stable Y, and mordenite.

Exhaust gas generated on engine start-up is contacted with the adsorbing agents. At this point the temperature of the exhaust gases is in the first temperature range, so that the first temperature adsorbing agent adsorbs the hydrocarbons. When the temperature of the exhaust gas increases to the second temperature range, the second temperature adsorbing agent begins to adsorb the generated hydrocarbons. Also, the second temperature adsorbing agent can adsorb any hydrocarbons desorbed from the first temperature adsorbing agent or products resulting from any cracking of hydrocarbons in the presence of the first temperature adsorbing agent. With continued operation of the engine, the exhaust gas temperature is raised to the third temperature range at which point the third temperature adsorbing agent adsorbs the generated hydrocarbons, or products resulting from any cracking of hydrocarbons which occurred in the presence of the first and/or second temperature adsorbing agents. When the temperature of the exhaust gas rises above the third temperature range, the low molecular weight alkanes and alkenes on a zeolite such as ZSM-5 will in part be desorbed. This is shown in FIG. 2 with propylene and ZSM-5 wherein about 31 wt. % is desorbed, and the balance, about 69 wt. % has decomposed or oxidized. In the case of the mixed zeolites, ZSM-5, Ultrastable Y, and mordenite, only about 22 wt. % is desorbed and the balance, about 78 wt. % has decomposed or oxidized. Any desorbed hydrocarbons from the adsorbing agents can be converted to innocuous products by a main body catalyst when the catalyst reaches operating temperature.

In auto exhaust conversion, the main body catalyst can be any conventional catalyst for converting $NO_x$, CO, and hydrocarbons to innocuous products. Some especially suited catalysts are noble metals on supports such as, for example, Pt, Pd, Rh, or combinations thereof on alumina, ceria, lanthana, zirconia, or combinations thereof. It is preferred to use a three-way catalyst. Some typical three-way catalysts which are especially suited to the practice of the present invention are Pt on ceria-alumina combined with Rh on zirconia. The Pt-ceria-alumina and the Rh-zirconia can be combined and applied at once, as in a single coating, or they can be applied in separate coatings onto a substrate. Another suitable catalyst is Pt/Pd/Rh on gamma alumina with a rare earth oxide such as ceria.

The hydrocarbon-removing agents are typically in contact with a substrate. The substrates can be of any size and shape suitable to the application, for example, pellets, beads, monoliths, etc. The substrates are most typically monolith substrates. The monoliths are typically bodies having inlet and outlet ends and a multiplicity of open ended cells extending from inlet to outlet end with porous walls between and separating adjacent cells from one another. The monoliths are preferably honeycomb structures.

In auto exhaust conversion, the hydrocarbon removing agents can be used as part of a multi-stage system for converting $NO_x$, CO, and hydrocarbons in exhaust gas to innocuous products. By innocuous products is meant those that are generally considered to be harmless to health and the environment, such as, $CO_2$, $H_2$, $N_2$, and water. One stage is the hydrocarbon-removing agents. The other stage is a main body catalyst which converts $NO_x$, CO, and hydrocarbons. The hydrocarbon-removing stage can be positioned either upstream or downstream of the main catalyst. It is most typical to position the hydrocarbon-removing stage upstream of the main body catalyst.

The hydrocarbon removing agents and main conversion catalyst can share one substrate unit or they can be on separate units. In the former case, the hydrocarbon removing agents can be on the inlet end of the substrate and the main conversion catalyst can be on the outlet end.

In auto exhaust conversion applications, the hydrocarbon removing agents and main conversion catalyst are typically on separate substrates. The substrates are placed one after the other so the exhaust gas flows from inlet to outlet ends. The flow can be either in line from one directly to the other without by-pass valving. Or bypass valving can be used as is done in the art to divert the flow of gas in order to isolate the adsorber stage after cold start.

The substrates are made of material that is suitable for high temperature applications. Some preferred materials are those that include as a predominant phase: ceramic, glass-ceramic, glass, high surface area thermally stable oxides, metals, and combinations thereof. By combinations is meant physical or chemical combinations, e.g., mixtures, compounds, or composites. Some materials that are especially suited to the practice of the present invention, although it is to be understood that the invention is not limited to these, are those made of cordierite, mullite, clay, talc, zircon, zirconia, spinel, alumina, silica, borides, lithium aluminosilicates, alumina silica, feldspar, titania, fused silica, nitrides, borides, carbides, e.g., silicon carbide, silicon nitride or mixtures of these. Some typical ceramic substrates are disclosed in U.S. Pat. Nos. 4,127,691 and 3,885,977. Those patents are herein incorporated by reference as filed. Other types of bodies are porous metal bodies. Some preferred types of porous metal bodies, although it is to be understood that the invention is not limited to such, are bodies made of iron group metals such as, for example, Fe-Al or Fe-Cr-Al with optional additions for enhancement of various properties. For example, additions of oxides are included for enhancement of properties such as heat, corrosion, oxidation resistance, etc. Some porous metal bodies which are especially suited to the practice of the present invention are discussed in U.S. Pat. Nos. 4,758,272 and 4,992,233 and in U.S. application No. 07/767,889, (European patent application publication No. 488716A1) filed Sep. 30, 1991. These patents and application are herein incorporated by reference as filed.

Some examples of honeycombs produced by the process of the present invention, although it is to be understood that the invention is not limited to these, are those having about 94 cells/cm$^2$ (about 600 cells/in$^2$), about 62 cells/cm$^2$ (about 400 cells/in$^2$), or about 47 cells/cm$^2$ (about 300 cells/in$^2$), those having about 31 cells/cm$^2$ (about 200 cells/in$^2$), or about 15 cells/cm$^2$ (about 100 cells/in$^2$), or about 2.5 cells/cm$^2$, (about 16 cells/in$^2$) or about 1.5 cells/cm$^2$ (about 9 cells/in$^2$). These bodies are made preferably of, but not limited to materials which when fired form cordierite. Typical wall thicknesses in catalytic converter applications, for example, are about 6 mils (about 0.15 to about 0.6 mm). The external size and shape of the body is controlled by the application, e.g., engine size and space available for mounting.

The substrate body can have any degree of wall porosity from low to high. For example, typically the wall porosity ranges from about 1% by volume to higher values which are determined by practical limits depending on the composition of the substrate and the intended application, e.g., the nature of the material which is to be coated on the walls, etc. The porosity is typically about 30% to about 70% by volume. The invention is especially suited for low-to-moderate porosity bodies, that is, those having total porosities of about 30% to about 50% by volume.

In general, the average pore size is about 2 to 70, and preferably about 3 to 50 microns in diameter for most applications. The adsorbing agents and/or catalysts can be applied to the substrate by conventional washcoating or spraying techniques. For example, the substrate is contacted with a slurry containing the agent and other components as permanent and temporary binders and precursors, dispersing agents, vehicles for slurrying, etc, as is known in the art. Some binders are aluminum oxide, most preferred of which is the precursor boehmite, other precursors of aluminum oxide, e.g., aluminum nitrate, and silica, titania, zirconia, rare earth oxides, e.g., ceria, etc, and their precursors. The adsorbing agents can be applied separately or as mixtures of more than one adsorbing agent.

Some typical compositions that can be used for molecular sieve adsorbing agents are in percent by weight 0 to about 50 methylcellulose, 0 to about 50 silica, 0 to about 50 $Al_2O_3$ from boehmite, aluminum nitrate, or alumina sol, and about 50 to about 95 of the agents. More preferred compositions are in percent by weight 0 to about 5 methylcellulose, 0 to about 10 silica, 0 to about 15 alumina from aluminum nitrate, 0 to about 15 alumina from boehmite, and about 70 to about 90 of the adsorbing agents.

Unavoidable impurities can also be present in the compositions if they do not interact with the constituents of these compositions. However, impurities that cause sintering or destruction of the zeolite structure must be kept at low levels. Most typically, impurities should be kept below about 5 wt. %, preferably below about 1% and most preferably below about 0.01%. Some especially preferred compositions are given in the Table. In each case, the constituents or their precursors are blended with about 0.5 to about 2.0% methylcellulose (Dow A4M). In each case a slurry is formed in a suitable machine such as a ball mill, mix-muller, or double-arm mixer by admixing the blended constituents with a liquid medium optionally containing about 0.01 to about 1.0% by weight of a surface active agent such as Airco's Surfanol 485. The preferred liquid medium is water, however organic liquids in combination with water can also be used, for example, isopropyl alcohol+water. Organic liquids by themselves can be used also, e.g., toluene or xylene.

cle is used to attain the proper plasticity, viscosity for handling and filling. For example, the constituents in the Table can be used with a suitable amount of liquid medium to form the paste. The paste is formed in a suitable machine such as a mix-muller, double-arm mixer, or calender rolls by admixing the constituents with a vehicle. The preferred vehicle is water, however, organic liquids in combination with water can be used, for example, isopropyl alcohol and water. Or organic liquids alone can be used, e.g., toluene or xylene. The paste is injected into selected cells of the substrate such as by hydraulic injection e.g., using a hydraulic press. One especially preferred technique for loading honeycombs is to use bodies which have alternate cells plugged at one end. In this technique, the cells or channels which are not to be filled are plugged at one end. This can be done by any known technique. In one technique a mask usually of rubber, is used. The mask has openings to match the cell number and size of the cells of the body. One set of openings is blocked by the rubber mask in the pattern that is contemplated for the cells which are to be subsequently loaded. The mask is placed on one end of the body and the cells of the body not blocked by the mask are plugged with plugging material. The plugging material is typically a low firing ceramic composition but can be an type of cementicious or polymer type material which after heat treatment or curing is inert to the filling operation. The mask is then removed and the body is heat treated or cured and is then ready to be loaded with filler material. One preferred technique for loading the cells of the body is to introduce a mixture of the desired composition of filler material which is typically in the form of a paste, into the end of the body which has plugged cells exposed to the paste. Filling of the cells is accomplished by pushing the appropriate amount of paste material into the unplugged cells with a hydraulic press. If necessary, the loaded body is then dried and fired to remove liquid phases, fugitive additions such as temporary binders and

TABLE

| Constituent | A | B | C | D | E | F | G | H | I | J |
| --- | --- | --- | --- | --- | --- | --- | --- | --- | --- | --- |
| WEIGHT PERCENT CONSTITUENTS OF ADSORBER COMPOSITIONS AFTER FINAL HEAT TREATMENT | | | | | | | | | | |
| ZSM-5 [$SiO_2/Al_2O_3$ = 26/1] | — | 45 | — | — | — | 30 | — | — | — | 85 |
| ZSM-5 [$SiO_2/Al_2O_3$ = 150/1] | — | — | 45 | — | — | — | — | — | — | — |
| ZSM-5 [$SiO_2/Al_2O_3$ = 55/1] | 28.3 | — | — | — | — | — | — | — | — | — |
| ZSM-5 [$SiO_2/Al_2O_3$ = 280/1] | — | — | — | 45 | 30 | — | — | — | 30 | — |
| Beta Zeolite [$SiO_2/Al_2O_3$ = 20/1] | — | — | — | — | — | — | — | 30 | — | — |
| Ultra Stable Y [$SiO_2/Al_2O_3$ = 12.5/1] | 28.3 | 40 | — | — | 30 | — | 89 | 30 | 30 | — |
| Ultra Stable Y [$SiO_2/Al_2O_3$ = 200/1] | — | — | 40 | — | — | 30 | — | — | — | — |
| Mordenite [$SiO_2/Al_2O_3$ = 20/1] | 28.4 | — | — | 45 | 30 | 30 | — | 30 | 30 | — |
| Gamma alumina [from Dispersal Boehmite, Condea Chemie] | — | 15 | 12 | 10 | — | 7 | — | — | — | — |
| Alumina [from Nyacol AL colloidal alumina sol] | 15 | — | — | — | — | — | — | 10 | — | 15 |
| Gamma Alumina [from Reagent Aluminum nitrate] | — | — | 3 | — | — | 3 | — | — | — | — |
| Silica [from DUPONT Ludox S-40] | — | — | — | — | 10 | — | 11 | — | 10 | — |

These compositions in slurry form are used to coat substrates. For example, the substrate is dipped into the slurry, repeatedly if necessary until the desired amount of the composition is coated on the substrate. Excess slurry is removed and the coated substrate is dried and fired.

Another technique of applying the agents to the substrates is to fill the cells of the multicellular substrate with the agent. In this technique, a paste is formed of the agent, binder or binders, and plasticizers. A preferred binder and plasticizer is methylcellulose. A vehirheological agents. The plugging is then removed, such as by sawing it off. If polymers are used as the plugging material, the plugs are burned off.

The adsorbing agents can be loaded as one admixture, or they can be loaded individually in any order depending on the pattern of adsorption which is desired.

To more fully illustrate the invention, the following non-limiting examples are presented. All parts, portions, and percentages are on a weight basis unless otherwise stated.

The hydrocarbon containing gas stream used in the following examples has the following composition (vol%):

$NO_x$=1000 ppm, CO=1%, $H_2$=0.33%, $O_2$=0.77%, $CO_2$=14%, propylene=500 ppm, 2.5% water, balance $N_2$. Space velocity=50,000 volume changes/hr

Example 1 (Comparative Example)

Composition J of the table is made up as follows to obtain a 44.3% washcoat (44.3 g washcoat per 100 g of substrate):

Weighed quantities of ZSM-5 zeolite (silica/alumina=26:1) and colloidal alumina binder are mixed into deionized water and then roll milled for about 2 hours to obtain a uniform dispersion containing about 85% zeolite and 15% gamma alumina on a dry weight basis. About 0.5% Surfanol 485 by Airco is used to assist dispersion and to function as a wetting agent. A cordierite honeycomb substrate (5.15 g, about 400 cells/in$^2$, or about 47 cells/cm$^2$, 1" (2.54 cm) diameter, 1" (2.54 cm) length) is then dipped into the dispersion for about 1 minute, removed, and the channels blown out with a stream of air to remove excess slurry. The coated substrate is then dried at about 150° C. in a circulating air oven and weighed. If insufficient coated solids are present, the dipping and drying procedure is repeated until the desired weight of coating is obtained. The substrate with the coating is then fired at about 500° C. for about 3 hours, and weighed. This sample weighs about 7.34 g (about 5.06 g cordierite, about 1.94 g zeolite+0.34 g alumina binder). The washcoated honeycomb is placed in a test furnace. The sample is exposed to the exhaust gas having the composition given above. The temperature is raised at about 10° C./min. FIG. 2 shows the adsorption of propylene up to about 200° C.; above about 200° C. about 31% of the total adsorbed propylene desorbs.

Composition A of the table is made up according to the procedure of Example 1 to obtain a 41.8% washcoat (41.8 g washcoat per 100 g of substrate) with the three zeolites being dry blended first. The washcoated honeycomb is placed in a test furnace. The sample is exposed to the exhaust gas having the composition given above. The temperature is raised at about 10° C./min. FIG. 2 shows the adsorption of propylene up to about 160° C.; above about 160° C. only about 22% of the total adsorbed propylene desorbs. This shows a greater fraction of the adsorbed propylene is retained when the mixed zeolite adsorber is used than when the single adsorber is used.

What is claimed is:

1. A method for removing low molecular weight hydrocarbons from a gaseous mixture, the method comprising:
    a) selecting a plurality of agents which are effective for adsorbing said hydrocarbons in the temperature range of maximum adsorption rates for said hydrocarbons within said temperature range, wherein for at least two of said adsorbing agents, the temperatures at which the maximum adsorption rates for said hydrocarbons occur, are different from one another, wherein one adsorbing agent is a first temperature adsorbing agent having a maximum adsorption rate which occurs at a first temperature of room temperature to about 160° C., the first temperature adsorbing agent being selected from the group consisting of ZSM-5 zeolite, beta zeolite, and combinations thereof, wherein one adsorbing agent is a second temperature adsorbing agent having a maximum adsorption rate which occurs at a second temperature of about 90° C. to about 175° C., the second temperature adsorbing agent being ultra stable Y zeolite, and wherein one absorbing agent is a third temperature adsorbing agent having a maximum adsorption rate which occurs at a third temperature of at least about 110° C., the third temperature adsorbing agent being mordenite; and
    b) contacting said adsorbing agents with said gaseous mixture at said temperature range to cause adsorption of said hydrocarbons.

2. A method of claim 1 wherein all of said first temperature, second temperature, and third temperature adsorbing agents are present in a coating on a substrate.

3. A method of claim 1 wherein the hydrocarbons have 1 to 6 carbon atoms.

4. A method of claim 3 wherein the hydrocarbons are selected from the group consisting of alkanes, alkenes, and combinations thereof.

5. A method of claim 1 wherein the hydrocarbons have a Maximum Incremental Reactivity of greater than about 1.0.

* * * * *